July 1, 1952  J. L. JONES, JR  2,602,110
TIME MEASURING APPARATUS
Filed March 16, 1948  2 SHEETS—SHEET 1

Inventor
J. L. Jones, Jr.
By M. C. Hayes
Attorney

July 1, 1952　　　　　　J. L. JONES, JR　　　　　　2,602,110
TIME MEASURING APPARATUS
Filed March 16, 1948　　　　　　　　　　　　　2 SHEETS—SHEET 2

Inventor
J. L. Jones, Jr.
M. Hayes
By
Attorney

Patented July 1, 1952

2,602,110

UNITED STATES PATENT OFFICE 2,602,110

TIME MEASURING APPARATUS

John Lloyd Jones, Jr., Henry, Ill.

Application March 16, 1948, Serial No. 15,172

16 Claims. (Cl. 175—381)

(Granted under the act of March 3, 1883, as amended April 30, 1928; 370 O. G. 757)

This invention relates to electrical measuring apparatus, and more particularly to thyratron controlled apparatus especially suitable for measuring the time intervals involved in the operation of electric detonators, for example, the time between the application of the potential and the breaking of the detonator bridge, the time between the application of the firing potential and the explosion of the detonator, and the time between the breaking of the detonator bridge and the explosion of the detonator.

Prior art devices for measuring the time intervals involved in the operation of electric detonators have a number of disadvantages: for example, they are inaccurate, and are in some instances unable to distinguish between the bridge wire breaking time and the explosion time of the detonator.

In accordance with the preferred embodiment of the instant invention, a cathode ray oscilloscope having a Z-axis beam intensity control circuit is employed in conjunction with a thyratron which controls the current flow through the detonator bridge. The use of a thyratron eliminates the chatter usually introduced by mechanical switching. A circuit is provided for making a spiral trace on the oscilloscope, and having a switch associated therewith for starting the trace. A spiral trace is employed because it makes most efficient use of the area of the fluorescent screen, resulting in increased accuracy. The same aforementioned switch applies potential to an R-C network, which, after the elapse of a suitable time interval sufficient to permit the trace to begin, fires the thyratron and current begins to flow through the detonator bridge which is connected in series with the thyratron anode-cathode circuit. The Z-axis control circuit of the amplifier is operatively connected to the anode of the thyratron, and the change in potential at the anode when the tube fires causes the trace to be diminished or increased in intensity, according to the arrangement of the Z-axis control circuit. When the detonator bridge breaks, current through the thyratron ceases, the anode assumes its original potential, and the trace on the fluorescent screen of the cathode-ray oscilloscope again changes in intensity. If desired, means may be provided for photographing the trace on the screen, or if desired a cathode-ray oscilloscope having a long persistence screen may be employed for providing a trace which has sufficient persistence to permit the use of a protractor for measuring the time intervals directly on the fluorescent screen.

In the operation of the apparatus, a wire is wrapped around the detonator case, and is broken by the force of the detonator explosion. This wire is connected in the R-L-C circuit which controls the spiral trace, and the breaking of the wire at the instant of the explosion causes the trace to collapse, thereby providing an indication of the instant of the explosion.

One of the objects of the invention is to provide new and improved apparatus for measuring the time intervals involved in the operation of an electric detonator.

Another object resides in the provision of a new and improved circuit arrangement employing a gaseous electron discharge tube for measuring the time between the breaking of an electroresponsive detonator bridge and the explosion of the detonator.

Another object resides in the provision of a new and improved circuit arrangement for measuring time intervals, in which the spiral trace of a cathode-ray oscilloscope is employed as the indicating means.

Another object resides in the provision of a new and improved circuit arrangement for measuring the time interval between the application of current to a detonator bridge and the explosion of the detonator.

Another object resides in the provision of a new and improved circuit arrangement for measuring the time between the application of current to a detonator bridge and the breaking of the bridge.

Still another object is the provision of a new and improved circuit arrangement for accurately controlling and measuring the current applied to a detonator bridge.

A further object is to provide a new and improved circuit arrangement for utilizing a gaseous electron discharge tube in time-measuring apparatus.

Other objects, advantages, and improvements not specifically set forth hereinbefore will be apparent from a consideration of the following specification when taken in conjunction with the accompanying drawings, in which.

Figure 1:
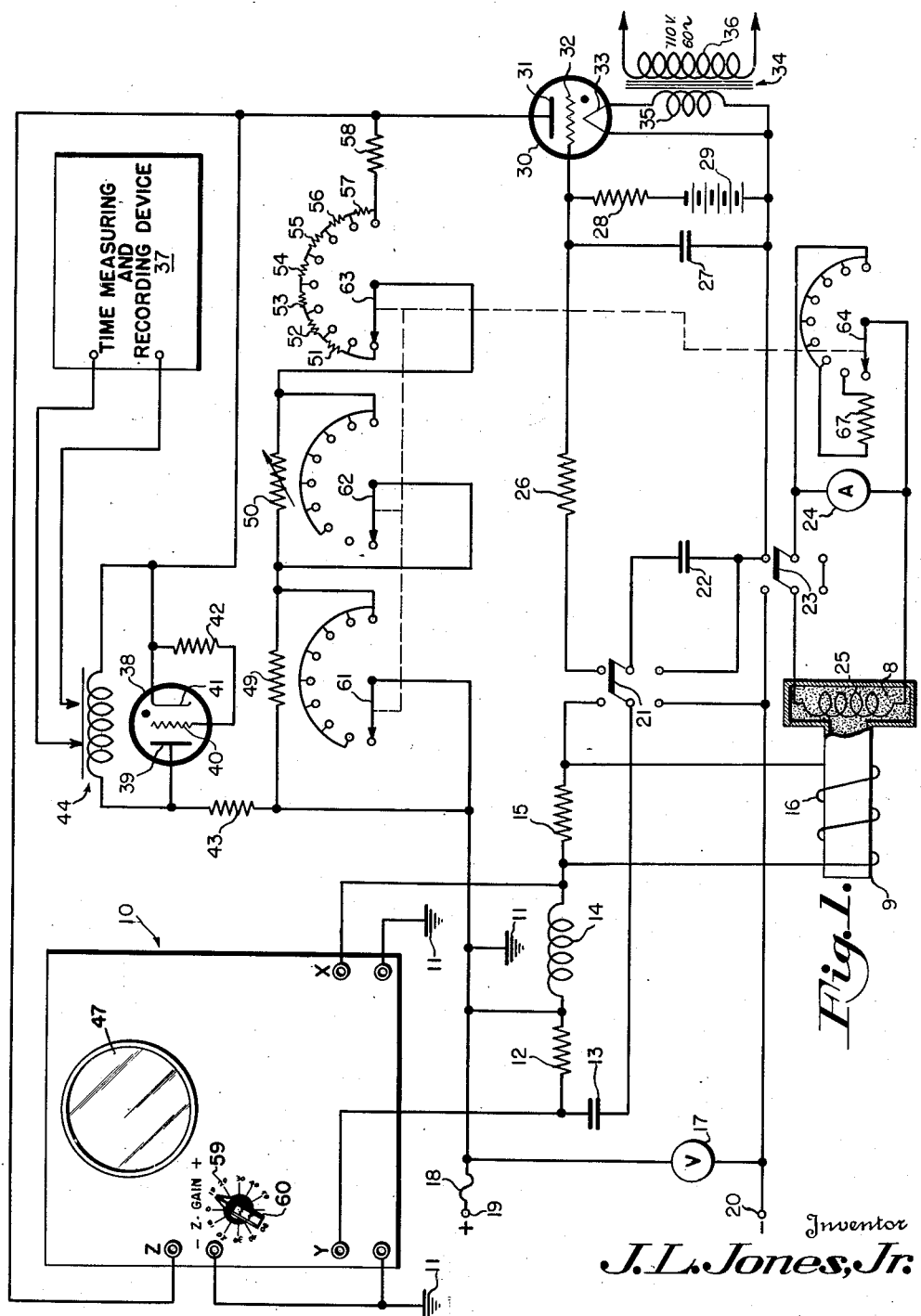
Fig. 1 is a schematic diagram of a complete electrical system according to the preferred embodiment of the invention.

Referring now particularly to the drawings for a more complete understanding of the invention, and more particularly to Fig. 1 thereof, there is shown at 25 a detonator bridge winding which, it is understood, is contained within the detonator 9, in predetermined operative relation with respect to the explosive charge 8, and is adapted when heated to a predetermined temperature by the flow of current therethrough, to cause the explosion of the explosive charge.

Winding 25 is connected in series with an ammeter 24 to the two center terminals of a double-pole double-throw switch designated by the reference numeral 23. The ammeter 24 may have any suitable full scale value, for example, 150 milliamperes. Connected to ammeter 24 is a single pole nine-position switch 64. When the switch 64 is on the first contact as shown on the drawing, no circuit connection is made through the switch. When switch 64 is on the second contact, shunt resistor 67 is connected across the ammeter 24, increasing the full scale range thereof to any desired value, for example, to 1.5 amperes. When the switch 64 is on contacts 3–9 inclusive, the ammeter 24 is shorted out of the circuit.

The lower contacts of switch 23, as viewed in Fig. 1, are connected together, thereby providing a safety short circuit for the detonator bridge 25 when the switch 23 is closed in this position. The left-hand one of the upper terminals of switch 23 is connected to terminal 20 which is connected to the negative side of a source of D. C. potential which may be of the order of 110 volts. The right-hand one of the upper terminals of switch 23, as viewed in Fig. 1, is connected to the filament 33 of a gaseous triode 30, having in addition to the aforementioned filament, a control grid 32, and an anode 31. Whereas any suitable gaseous triode may be used, in the embodiment herein described a tube known in the trade as a W. E. 323 A is preferred for this purpose.

The filament is connected to the secondary 35 of a filament heating transformer generally designated by the reference numeral 34 and having a primary 36 which is connected by suitable leads to a source of energizing potential, not shown, for example, 110 v., A. C., 60 c. p. s.

A capacitor 27, which may have a capacitance value of the order of 1 mfd., is connected between the grid 32 and filament 33 for purposes to be hereinafter more fully described. Also connected between the aforementioned grid and filament is a battery 29 which may supply a potential of the order of 45 volts connected in series with a fixed resistor 28 which may have a resistance value of 50 kilohms.

A second double-pole double-throw switch 21 is also provided. The right-hand center post of switch 21, as viewed in Fig. 1, is connected by way of capacitor 22, which may have a value, for example, of 40 mfd., to the filament 33. The left-hand center post of switch 21 is connected by way of capacitor 13, which may have a capacitance value of the order of 0.45 mfd., to the high potential post of the Y-input of a cathode-ray oscilloscope, presently to be more fully described, and generally designated by the reference numeral 10.

The lower left-hand terminal of switch 21 is connected to the aforementioned negative terminal 20, while the lower right-hand terminal of switch 21 is connected to capacitor 22 and filament 33.

The upper left-hand terminal of switch 21 is connected by way of resistor 15, which may have a value of 100 kilohms, inductor 14, which may have an inductance of 0.89 henries, and resistor 12, which may have a value of 10 ohms, connected in series in the order named, to that terminal of capacitor 13 which is connected to the aforementioned high potential post of the Y axis circuit of oscilloscope 10.

The junction between resistor 12 and inductor 14 is connected to ground 11 and to one end of fuse 18 which has the other end thereof connected to terminal 19 to which is connected the positive terminal of the aforementioned source of D. C. supply. A voltmeter 17 is provided for measuring the voltage across terminals 19 and 20.

The junction between inductor 14 and resistor 15 is connected to the high-potential post of the X-axis control circuit of the oscilloscope 10, both the low-potential posts of the X-axis and Y-axis control circuits being connected to ground.

Across the aforementioned resistor 15 is connected the wire 16, which encircles the detonator case. The wire 16, which is of low resistance, effectively shorts resistor 15 until broken by the force of the detonator explosion.

The upper right-hand terminal of switch 21, as viewed in Fig. 1, is connected by way of resistor 26, which may be of the order of 750 ohms, to the control grid 32 of tube 30.

The anode 31 of tube 30 is operatively connected by way of a resistance network to ground at 11 and positive terminal 19. When the three single-pole nine-position switches 61, 62, and 63 are in the positions shown on the drawing, the path between anode and ground comprises the following, in the order named: resistor 58, which is preferably of 10 ohms, resistors 57–51 inclusive, which are each preferably of 10 ohms value, variable resistor 50, which is preferably of 500 ohms value, and fixed resistor 49, which is preferably of 500 ohms value.

The aforementioned resistance network is provided to permit a measured current flow through detonator bridge 25. Switches 61, 62, and 63 are preferably ganged together and to ammeter switch 64.

When the switches are on their first contacts respectively as illustrated, resistor 49 is in circuit, resistor 50 is in circuit, resistors 51–58 inclusive are in circuit, and ammeter 24 is connected for use with its lower current scale value. When switches 61–64 are in engagement with their second contacts respectively, resistor 49 is cut out of the circuit, the rest of the resistance remaining the same, and ammeter 24 is switched to its higher range. When the switches 61–64 inclusive are on their third respective contacts, ammeter 24 is shorted, and resistors 49—50 are short circuited and 51 is cut out of the circuit. Thereafter, additional movement of the switches cuts out the resistors 52–57 inclusive in succession, until when the switches are on their ninth or last contacts, only resistor 58 remains connected in circuit.

This switching arrangement provides a means for accurately determining the current and/or resistance in the detonator bridge circuit, it being understood that the resistance of tube 30, which may be considered infinite when the tube is not fired and the value of which may be readily ascertained when the tube is fired, is also in series with the detonator bridge winding 25. It is to be noted that the voltage drop across the thyratron 30 is substantially independent of current flow only up to a certain point; at higher currents, the relation between voltage drop and current within the tube must be known in order to ascertain the effective resistance of the tube at the desired current.

Connected between anode 31 and ground is a second gaseous triode tube 38, having the cathode 41 thereof connected to anode 31 and a control grid 40 connected by way of resistor 42 to cathode 41, and having an anode 39 connected by way of resistor 43 to ground 11. Across anode 39 and cathode 41 is connected the winding of a relay generally designated at 44, and which has the contacts thereof connected to electric time measuring and recording apparatus, which may be of conventional design, and which is shown at 37.

It is contemplated that a heater be provided for tube 38 having any convenient means connected thereto for energizing the heater.

A connection is provided between anode 31 and the high potential terminal of the Z-axis control circuit of oscilloscope 10, the low potential terminal of the Z-axis control circuit being connected to ground 11.

The cathode-ray oscilloscope is preferably of a type known in the trade as a "Dumont" type 247. Whereas only the knob control 60 for the Z-axis amplifier or control circuit is shown, with its accompanying scale 59, it is understood that the oscilloscope, in addition to the fluorescent screen 47, has the usual or conventional focus, intensity, horizontal and vertical centering, Y-axis gain, and X-axis gain controls.

The Z-axis control circuit, as may be noted from viewing Fig. 1, is adapted to provide an increase in intensity upon either a negative or positive potential being applied to the high potential terminal post Z, selectively in accordance with the position of knob 60, whether to the negative or positive side of the zero position. The input arrangement of the Z-axis control circuit may be conventional and include a coupling capacitor between the input terminal and the control grid of an amplifier tube.

The apparatus of the instant invention is adapted to test detonators of a wide variety of types, and over a wide range of operating values. As is well known to those skilled in the art, an electric detonator consists essentially of an explosive charge, and a heater element or bridge winding disposed in predetermined operative relation to said charge and arranged, when heated to a predetermined temperature or above, to explode the charge. It is characteristic of electric detonators that if a small current is applied to the bridge winding, sufficient heat may be generated to explode the charge before the wire burns out, whereas if a large current flows through the winding, it may burn out before the charge explodes, which explosion will follow after a finite interval of time after the winding burns out as determined by the physical constants and characteristics of the apparatus. It is apparent, therefore, that there are three important time intervals in connection with electric detonators which it is desirable to measure as follows:

(1) At low currents, the interval between the initial application of the current and the explosion, which causes the breaking of the bridge current;

(2) At higher currents, the time interval between the initial application of the current and the burning out of the bridge; and (3) At these higher currents, the interval between the burning out of the bridge and the explosion of the detonator.

The circuit of the apparatus has been traced, and the operation thereof will be more clearly apparent as the description proceeds. Assume by way of description that it is desired to measure the time interval between the application of a potential which causes a predetermined small detonator bridge current, and the explosion of the detonator which causes the breaking of the bridge circuit and, of course, coincides therewith.

Switches 21 and 23 are normally closed in their down positions. In such positions, bridge 25 is shorted, capacitor 22 is shorted, and battery 29 maintains through resistor 28 a negative charge on capacitor 27 sufficient to maintain tube 30 in a nonconducting condition. Capacitor 13 is fully charged through resistor 12 from the source of D. C. supply.

Switches 61–64 inclusive are set at their desired positions, for example, on their first contacts.

Switch 23 is now thrown to its up position, Fig. 1, which connects the ammeter 24 and bridge winding 25 in series in the anode-cathode circuit of thyratron or gaseous tube 30.

Switch 21 is now thrown to its up position, and a closed circuit is completed from one terminal of capacitor 13 through switch 21, through the wire 16 encircling the detonator case which has resistor 15 connected in parallel therewith, through inductor 14, through resistor 12, to the other terminal of capacitor 13. This circuit, with its aforementioned connections to the X-axis and Y-axis circuits of oscilloscope 10, provides a spiral trace on the fluorescent screen 47. The circuit operates in a conventional manner to produce the spiral trace, and the operation thereof need not be described in detail, it being sufficient to note that the trace becomes of smaller diameter as the elapsed time increases.

With switch 21 closed in its up position, capacitor 27 starts to discharge through resistor 26 into capacitor 22, which is very large in comparison with capacitor 27. Resistor 28 is very large with respect to resistor 26. Accordingly, after a time interval of a length determined by the circuit constants, the negative bias on grid 32 falls to a value which permits the tube to conduct.

When the tube 30 becomes conducting, current flows therethrough from the D. C. source, and through winding 25, the amount of current depending upon the position of switches 61–63 inclusive and the resistance of the detonator bridge.

Before the tube 30 starts to conduct, the anode thereof is at ground potential; at the moment the tube 30 starts to conduct, the anode becomes negative with respect to ground by an amount determined by the I. R. drop across resistors 49–58 inclusive, and this negative potential is applied to the Z-axis control circuit, and results in a decrease or increase in the intensity of the beam, as the case may be, depending upon the position of switch 60.

After a time interval as determined by the physical characteristics of the detonator, the heat generated by the winding raises the temperature of the charge to the value at which the explosion takes place. The wire 16 is broken by the force of the explosion, which effectively places the high resistance 15 in circuit, which causes the spiral trace to be discontinued.

Figure 3:
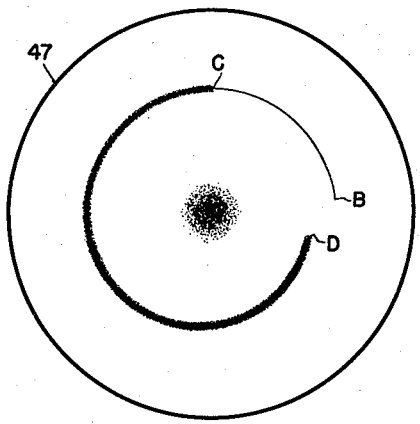
Figs. 3, 4, and 5 are views of typical spiral traces which are obtained when utilizing the apparatus for measuring detonator time intervals.

Reference is made now to Fig. 3, in which is shown the trace obtained under such a condition of operation. That portion of the trace between points B and C represents the time interval between the instant when switch 21 is closed in its up position and the instant tube 30 starts to conduct, which latter instant is also the instant of initial application of current to the detonator bridge. The portion of the curve between points C and D represents the time interval between the application of current to the detonator and the explosion thereof. The elapsed time may be calculated from the trace obtained, in a manner well known to those skilled in the art.

Assume now by way of description that it is desired to test a detonator under higher current conditions in which the bridge winding breaks or burns out before the explosion takes place. Assuming that capacitor 13 has been charged and capacitor 22 discharged by throwing switch 21 to its down position, upon throwing switch 21 to its up position, the spiral trace starts, at a moment indicated by the beginning of a trace at E in Fig. 4. After a time interval, tube 30 fires at instant F on the trace. After a time interval, the bridge burns out and the circuit through tube 30 is broken, whereby the anode 31 returns to zero potential with respect to ground, at the instant G, Fig. 4.

As previously stated the circuit of the Z-axis control of oscilloscope 10 has capacity in series therein. The effect of this capacity is to provide a condition such that instead of the trace returning to its first condition, it is substantially "blacked out" until the input circuit of the Z axis amplifier returns to its normal first condition. This requires a time indicated by the distance between points G and H, Fig. 4. From H the trace resumes its normal intensity until the wire 16 breaks with the explosion, stopping the trace at J.

Figure 4:
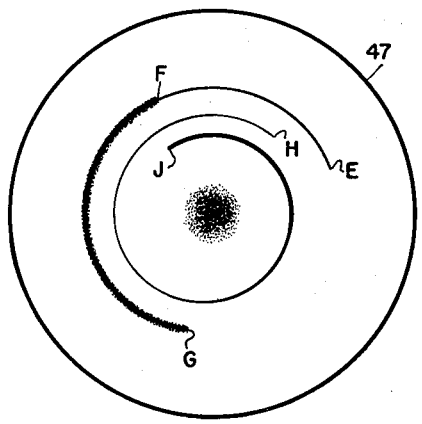
Figure 5:
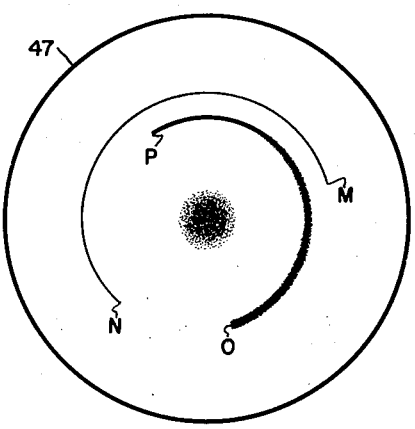

It was noted that the trace of Fig. 4 disappears for a time interval between G and H. If the explosion had taken place during this interval, it would have been impossible to determine the point or instant at which the explosion took place. Where the time interval between the breaking of the bridge and the explosion is brief, the Z-axis control knob 60 is switched to its position of opposite polarity, and a trace such as that shown in Fig. 5 is obtained. In Fig. 5, M represents the beginning of the trace, N the moment when tube 30 starts to conduct and current is applied to the detonator bridge winding, O the point in time at which the bridge wire burns out, and P the instant of the explosion and the breaking of the wire 16 around the detonator case.

It is noted that as a result of the tube characteristics the traces may tend to become generally more intense as they move closer to the center of the fluorescent screen.

It will be understood by those skilled in the art that the frequency of the spiral trace is determined substantially by the L, C, and R constants of the circuit of elements 12, 13, and 14, the resistance of 16 being negligible, and may be calculated from the formula:

$$f = \frac{1}{2\pi}\sqrt{\frac{1}{CL} - \left(\frac{Rt}{2L}\right)^2}$$

Where C and L are the values of 13 and 14 respectively, and Rt is the total resistance of 12 and 14. For example, a convenient trace frequency is one making 250 revolutions per second. The values of the circuit constants may be conveniently adjusted to desired values by applying a 1,000 cps sine wave to the Z-axis amplifier and adjusting the spiral trace control circuit to provide a pattern such as that shown in Fig. 2.

Figure 2:
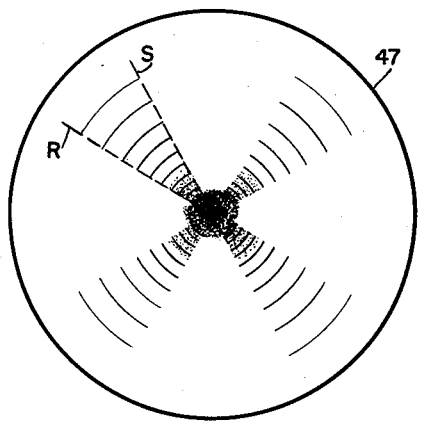
Fig. 2 is a view of a typical test trace on the cathode-ray oscilloscope of Fig. 1 when a sine wave is applied to the Z-axis.

Final adjustment consists in varying a convenient constant, for example, the capacitance value of 13, until in the pattern of Fig. 2, the ends of the intensified portions are precisely aligned as indicated by radial lines R and S, it being understood that all the visible sections of the trace should be so aligned.

It will be understood that, the frequency of the trace being known, the time intervals between the various designated points on the traces may be readily determined by use of a protractor or other suitable means.

A supplementary measuring circuit including thyratron 38 and timer 37 is provided for measuring longer time intervals not requiring the use of the cathode-ray oscilloscope. These long time intervals are those in which low currents are applied to the detonator, and in which the explosion time corresponds to the bridge wire breaking time.

When current flows through tube 30, a potential difference is developed across winding of relay 44 through resistor 43, and the relay makes contact, initiating the operation of the timer 37. When the tube 30 ceases to conduct the winding of relay 44 is deenergized, and the contacts thereof broken, stopping the timer. The thyratron 38 is provided for increasing the speed of relay operation on the make thereof. It permits the use of a relay winding of low resistance, which has a heavy initial current flow therethrough. After a moment, as determined by the circuit constants, interelectrode capacity and ionization time of tube 38, the tube fires, placing a low resistance across the winding of 44, and preventing it from being damaged by a continuous heavy current flow therethrough.

Although the invention has been described in detail with particular reference to measuring the time intervals of an electrical detonator, it is not so limited as the apparatus embodying the invention is also well adapted to measure time intervals between the interruptions of any two circuits, it being merely necessary to connect the first one of said circuits to be interrupted in lieu of winding 25 and the second one of said circuits in lieu of wire 16, Fig. 1.

The time interval between the closings of two circuits may also be measured in accordance with the present invention, by connecting the first of the circuits to be measured in place of winding 16, and the second circuit in place of winding 25. When so employed, switch 23 is closed in its up position, and switch 21 is next closed in its up position. The closing of the first circuit under measurement starts the trace, and the closing of the second circuit to be measured modulates the intensity of the trace, it being assumed that sufficient time has elapsed since the R. C. circuit of 27—26 was closed by switch 21 to allow tube 30 to conduct.

Whereas the invention has been shown and described with reference to a particular embodiment thereof which gives satisfactory results, it will be apparent to those skilled in the art, after understanding the invention, that various changes and modifications may be made without departing from the spirit or scope of the invention, and it is therefore intended, in the claims appended hereto, to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. In apparatus of the character disclosed for measuring the time interval between the initial application of current to a detonator bridge winding and explosion of said detonator, in combination, a resistance network, a normally nonconducting gaseous electron discharge tube having an anode, control grid, and cathode, a source of D. C. potential, circuit means connecting said resistance network, the anode-cathode path of said tube, and said bridge winding all in series across said source of potential, a cathode-ray oscilloscope having intensity control means, means connected to said oscilloscope for producing a spiral trace on the fluorescent screen thereof, switching means associated with said last-named means for initiating said trace, a first capacitor connected between said grid and cathode, a second source of potential and a resistor connected in series between said cathode and grid, said second source of potential supplying a bias to said grid which normally maintains said tube in nonconducting condition, discharge resistance circuit means associated with said control grid and with said switching means for reducing said bias a predetermined time interval after the beginning of said trace to a value whereat said tube is rendered conducting, an intensity control connection between said tube and said cathode-ray oscilloscope, said oscilloscope being constructed and arranged to have the intensity of the beam thereof varied in response to variations in the potential at said connection, the beginning of the flow of current in said tube causing a change in the intensity of said beam, and shock actuated circuit interrupting means operatively connected to said trace producing means and to said detonator for interrupting said trace at the moment of the explosion of said detonator.

2. In apparatus of the character disclosed for measuring the time interval between the initial application of current to a detonator bridge winding and the explosion of the detonator, in combination, a normally nonconducting gaseous electron discharge tube having an anode, control grid, and cathode, a resistance network, a source of D. C. potential, circuit means connecting said resistance network, the anode-cathode path of said tube, and said detonator bridge winding, all in series across said source of potential, means for rendering said tube conducting thereby to start the flow of current through said detonator bridge, relay means connected across said resistance network and adapted to be energized by the potential difference thereacross when current flows in said tube, and means operatively connected to said relay means for measuring and recording the period of conduction of said tube, said bridge winding being broken by the force of the explosion, said winding when broken interrupting the flow of current through said tube and reducing the potential difference across said resistance network to zero, said relay being substantially simultaneously deenergized at the instant the potential across said network falls to zero, the deenergization of said relay stopping the operation of said measuring and recording means.

3. Apparatus according to claim 2 including in addition a second gaseous electron discharge tube having an anode, control grid, and cathode, the anode and cathode of said second tube being connected to the ends of said relay winding respectively, said control grid being operatively connected to the cathode thereof, said second tube when fired shunting said relay winding sufficiently to decrease the current flow therethrough to a low value and without releasing the relay.

4. Apparatus according to claim 2 wherein said resistance network is additionally characterized as being variable and including means for adjusting the current through said detonator bridge winding, and having means connected in circuit with said detonator bridge winding to indicate the value of current flowing therethrough.

5. Apparatus of the character disclosed for measuring the time interval between the application of a burn out current to a burnable detonator bridge winding under test and the burning out of the winding by said current comprising, in combination, a gaseous electron discharge device having an anode, a cathode, and a control grid, a source of D. C. potential sufficient to cause said burn out current to flow through said winding when the winding is connected thereacross, a circuit for connecting the anode-cathode path of said discharge device and the winding under test in series across said D. C. source, a condenser connected between said grid and cathode, a battery and a resistance connected in series across said condenser for charging said condenser to a bias voltage effective to render said discharge device nonconducting, an R. C. circuit and an initially open switch serially connected across said condenser for discharging the condenser sufficiently to render said discharge device conducting after said switch is closed and until the winding burns out, variable resistance means included in said first named circuit and connected to said anode for adjusting the discharge current in the circuit to the value of said burn out current, an electroresponsive timer, and a circuit including an electrical connection between one electrode of said tube and said timer for operating the timer in response to the voltage on said electrode while said burn out current flows through the discharge device.

6. Apparatus of the character disclosed for measuring the time interval between the application of a burn out current to a burnable detonator bridge winding under test and the burning out of the winding by said current comprising, in combination, an electron discharge device, a source of D. C. potential, a circuit connecting the main discharge path of said discharge device and said winding in series across said D. C. source, variable resistance means in said circuit for adjusting the current flow therein to the value of said burn out current when the discharge device is rendered conducting, bias means for initially rendering said discharge device nonconducting, means including a switch for decreasing the bias effected by said bias means when the switch is closed thereby to render the discharge device conducting until the circuit is interrupted as the winding burns out, and an electroresponsive timer connected to said variable resistance means and operable in response to the voltage developed thereacross while said burn out current flows through said discharge device.

7. Apparatus of the character disclosed for measuring the time between the application of a burn out current to a burnable detonator bridge winding under test and the burning out of the winding by said current, comprising, in combination, a source of D. C. potential sufficient to cause said current to flow through said winding when the winding is connected thereacross, a trigger tube including a control grid, a circuit for connecting the main discharge path of said tube in series with said winding across said D. C. source, bias means connected to said control grid for applying a bias voltage thereto sufficient to render said tube initially nonconducting, a circuit including a switch and said bias means and effective when the switch is closed to reduce said bias voltage sufficiently to render said tube conducting until said winding burns out, and an electroresponsive interval indicating means operatively connected to said series circuit for indicating the duration of said flow.

8. In apparatus of the character disclosed for measuring the time interval between the initial application of a firing current to a detonator bridge winding and explosion of the detonator, in combination, a resistance network, a normally nonconductively biased gaseous electron discharge tube having an anode, control grid, and cathode, a source of D. C. potential, switch means, a resistance-capacitance discharge circuit, means connecting said detonator bridge winding, said resistance network, and the cathode-anode path of said tube in series across the source of D. C. potential, a cathode-ray oscilloscope, means including a low resistance path connected to said oscilloscope for producing a spiral trace on the fluorescent screen thereof, circuit means for initiating operation of said spiral trace means upon the actuation of said switch means, circuit means for operatively connecting said resistance-capacitance discharge circuit to said control grid upon actuation of said switch means, said operatively connected discharge circuit being effective to make said tube conductively biased, means for controlling the intensity of the cathode-ray beam in accordance with the amplitude of a control potential applied thereto, a connection between said discharge tube and said last named means for applying said control potential thereto, and means associated with the detonator for interrupting said low resistance path at the moment of the explosion of said detonator to interrupt said trace.

9. In apparatus of the character disclosed for measuring the time interval between the initial application of a firing current to a detonator bridge winding and the breaking of the detonator bridge winding, in combination, a source of D. C. potential, switch means, a resistance-capacitance discharge circuit, a resistance network, a normally nonconductively biased gaseous electron discharge tube having an anode, control grid, and cathode, a circuit connecting said resistance network, the anode-cathode path of said tube and said bridge winding in series across said source of potential, a cathode-ray oscilloscope, means connected to said oscilloscope for producing a spiral trace on the fluorescent screen thereof, circuit means for initiating said spiral trace means upon the actuation of said switch means, circuit means for operatively connecting said resistance-capacitance discharge circuit to said control grid upon actuation of said switch means, said operatively connected discharge circuit being effective to make said tube conductively biased, means for controlling the intensity of the cathode-ray beam in accordance with the amplitude of a control potential applied thereto, and an intensity control connection between said series circuit and said last named means for applying said control potential thereto.

10. An apparatus for measuring the interval between the breaking of a first circuit and a breaking of a second circuit and comprising, in combination, a normally nonconductively biased electron discharge tube having an anode, control grid, and cathode, a source of D. C. potential, switch means, a resistance-capacitance discharge circuit, means connecting the anode-cathode path of said tube, said source of D. C. potential, and the first circuit in series, a cathode-ray oscilloscope, means including said second circuit and a low resistance path connected to said oscilloscope for producing a spiral trace on the fluorescent screen thereof, circuit means for initiating the operation of said spiral trace means on the actuation of said switch means, circuit means for operatively connecting said resistance-capacitance discharge circuit to said control grid upon actuation of said switch means, said operatively connected discharge circuit being effective to make said tube conductively biased, means for controlling the intensity of the cathode-ray beam in accordance with the amplitude of a control potential, an operative connection between said discharge tube and said last named means for applying said control potential thereto, said second circuit being connected in said low resistance path and adapted when broken to interrupt said trace.

11. Time interval measuring apparatus of the character disclosed comprising, in combination, a normally nonconductively biased gaseous electron discharge tube having an anode, control grid, and cathode, a source of D. C. potential, a resistance-capacitance discharge circuit for rendering said tube conducting when operatively connected to said grid, switch means for operatively connecting said discharge circuit to the grid, a first circuit adapted to be broken, means connecting the cathode-anode path of said tube and said first circuit in series across said source of potential, the breaking of said first circuit removing the potential from said gaseous discharge tube, a cathode-ray oscilloscope, means including a low resistance path connected to said oscilloscope, means for producing a spiral trace on the fluorescent screen thereof, a second circuit adapted to be broken and included in said low resistance path for interrupting said trace as the circuit is broken, means for controlling the intensity of the cathode-ray beam in accordance with a control potential applied to the oscilloscope, means including an operative connection between said discharge tube and said intensity control means for applying said control potential to the cathode-ray oscilloscope for increasing the intensity of the beam of said oscilloscope while current is flowing in said tube and thereafter decreasing the intensity of said beam when current ceases to flow in said tube, and circuit means for initiating said spiral trace means upon the actuation of said switch means.

12. A device according to claim 8 wherein said resistance network includes variable resistance means and further characterized by the provision of current indicating means connected in series with said resistance network for indicating the value of said firing current.

13. Apparatus according to claim 12 including in addition means operatively connected to said variable resistance means and to said current indicating means for selectively varying the range of the indicating means in accordance with the resistance value of said variable resistance means.

14. In apparatus of the character disclosed for timing the interval between the initiation of a current and a subsequent event resulting therefrom and the duration of said current flow, in combination, a resistance network, a switch, a normally nonconductively biased gaseous electron discharge tube having an anode, control grid, and cathode, a source of D. C. potential for supplying said current, an impedance, means connecting said impedance, said resistance network, and the anode-cathode path of said tube in series circuit across said D. C. potential as a path for said current, a discharge circuit adapted to reduce the bias on said tube at a predetermined rate upon connection to said grid, said tube being rendered conducting upon sufficient decrease in said bias at an instant corresponding to said initiation of flow of said current, a cathode-ray oscilloscope, initially unoperated single sweep spiral trace means connected to said cathode-ray oscilloscope circuit, circuit means including said switch for initiating said spiral trace and said bias reduction upon actuation of said switch, means for controlling the intensity of the cathode-ray beam of the oscilloscope in accordance with a control potential applied thereto, a pair of leads operatively connecting said intensity control means across said impedance in said series circuit to supply a predetermined value of said control potential upon initiation of said current whereby said intensity is changed during said current flow to indicate the duration thereof, and interrupting means actuable upon the occurrence of said event for discontinuing operation of said trace means thereby to provide a measure of said time interval between the initiation of said current and the actuation of said event.

15. In apparatus of the character disclosed for measuring the time interval between the burning out of a detonator bridge in response to current flow therethrough and the explosion of said detonator, in combination, a normally nonconducting gaseous electron discharge tube having an anode, control grid, and cathode, a source of D. C. potential, circuit means connecting the cathode-anode path of said tube and said detonator bridge in series across said source of potential, a cathode-ray oscilloscope having an intensity control input terminal, means including a shock actuated circuit interrupter and operatively connected to said cathode-ray oscilloscope for producing a spiral trace on the fluorescent screen thereof, means for initiating said trace, circuit means for initiating conduction in said tube subsequent to the initiation of said trace, the firing of said tube initiating the flow of said current through said bridge winding, an operative connection between an impedance point in said series circuit intermediate said D. C. potential source and said cathode-ray oscilloscope intensity control input terminal, said cathode-ray oscilloscope being constructed and arranged to have the intensity of the beam thereof varied in response to variations in the potential at said impedance point, the initiation of current flow through said tube and said winding changing the potential at said point thereby to change the intensity of said beam, the discontinuance of current through said tube when said winding is burned out causing a second change in the potential at said point and the intensity of said beam, said circuit interrupter being associated with said detonator and effective to interrupt said trace at the instant of the explosion of said detonator.

16. In apparatus of the character disclosed for measuring the time interval between the initial application of current to a detonator bridge winding and the burning out of said winding as a result of current flow therethrough, in combination, a detonator bridge winding, a cathode-ray oscilloscope for measuring and recording short conduction periods through said bridge winding, said cathode-ray oscilloscope having potential controlled intensity varying means, a first normally non-conducting gaseous electron discharge tube having an anode, control grid, and cathode, a bias reduction means connected to said first discharge tube control grid, a source of D. C. potential, circuit means connecting the cathode-anode path of said first tube and said detonator bridge in series across said source of potential, a second normally non-conducting gaseous electron discharge tube having an anode, control grid, and cathode, said second tube connected in series with the cathode-anode path of said first tube and said source of D. C. potential, time interval measuring and recording means connected to said second tube and energized upon conduction through said second tube for measuring and recording long periods of conduction through said bridge winding, means connected to said first and second discharge tubes and to said cathode ray oscilloscope for producing an aperiodic spiral trace on said oscilloscope screen during periods of conduction through said discharge tubes, manually operated means for controlling said bias reduction means thereby initiating current flow through said first and second discharge tubes, said trace producing means and said detonator bridge winding, said oscilloscope and said time interval measuring and recording means being simultaneously actuated upon conduction through said tubes and said bridge winding.

JOHN LLOYD JONES, Jr.

REFERENCES CITED

The following references are of record in the file of this patent:

UNITED STATES PATENTS

| Number | Name | Date |
| --- | --- | --- |
| 498,183 | Mower et al. | May 23, 1893 |
| 2,021,766 | Bivens | Nov. 19, 1935 |
| 2,208,376 | Luck | July 16, 1940 |
| 2,301,195 | Bradford | Nov. 10, 1942 |
| 2,314,795 | Luck | Mar. 23, 1943 |
| 2,408,039 | Busignies | Sept. 24, 1946 |
| 2,408,414 | Donaldson | Oct. 1, 1946 |
| 2,436,827 | Richardson | Mar. 2, 1948 |
| 2,442,123 | Espley et al. | May 25, 1948 |